June 20, 1961  S. BÖHM ET AL  2,988,973
PHOTOGRAPHIC CAMERAS OF THE TWO-FILM TYPE
Filed Oct. 10, 1957  5 Sheets-Sheet 1

INVENTORS
Siegfried Böhm
Heinrich Skolaude
BY Rolf Jurenz
Gert Jehmlich

June 20, 1961  S. BÖHM ET AL  2,988,973
PHOTOGRAPHIC CAMERAS OF THE TWO-FILM TYPE
Filed Oct. 10, 1957  5 Sheets-Sheet 2

INVENTOR.
BY Siegfried Böhm
Heinrich Skolaude
Rolf Jurenz
Gert Jehmlich

June 20, 1961 S. BÖHM ET AL 2,988,973
PHOTOGRAPHIC CAMERAS OF THE TWO-FILM TYPE
Filed Oct. 10, 1957 5 Sheets-Sheet 3

INVENTOR.
Siegfried Böhm
BY Heinrich Skolaude
Rolf Jurenz
Gert Jehmlich

United States Patent Office 2,988,973
Patented June 20, 1961

2,988,973
PHOTOGRAPHIC CAMERAS OF THE
TWO-FILM TYPE
Siegfried Böhm, Dresden, Heinrich Skolaude, Freital, and Rolf Jurenz and Gert Jehmlich, Dresden, Germany, assignors to VEB Kamera- und Kinowerke Dresden
Filed Oct. 10, 1957, Ser. No. 689,302
31 Claims. (Cl. 95—31)

This invention relates to a photographic camera of the two-film type permitting alternate exposure of black and white, color or reversible films of different gradation.

Two-film cameras in which exposure is effected by a central shutter disposed between the lenses of the taking objective or directly behind it have been proposed already. Their two films are either superposed or arranged side by side or at a right angle to each other in such manner that one or the other film can be selectively exposed by vertical or lateral displacement or turning of the taking lens forming a unit with the central shutter. It has further been proposed to associate a taking lens for each film with the central shutter and, by means of a slide, to cover one of the films or to release it for exposure.

These layouts, however, have not been generally adopted, chiefly because the technical requirements for the chosen arrangement of the films were found to be too complicated and expensive or demanded a casing that was too large or unwieldy. A further disadvantage is that the means for selective exposure of films are still too complex and consume too much time in operation.

Other known two-film cameras have a single taking lens and a central shutter. The two films are so placed that their spools lie parallel to the optical axis, and a rotary reflex mirror or prism disposed between the films deflects the path of light rays to the upper or lower film for exposure. In such constructions, however, the mirror or prism cannot be swung out of the path of rays, and the provision of parallax-free view finders is not possible.

The present invention proposes to effect selective exposure of the two films by a single lens with the aid of a mirror deflecting the path of light rays, the film spools extending in the direction of the optical axis. For selective exposure each film is associated with a focal plane shutter the curtain rolls of which are also disposed parallel to the optical axis of the taking lens. The film and the focal plane shutter proceed vertically to or across the optical axis, the films lying at a distance therefrom corresponding to the abutting length of the lens on the casing less the distance from the lens to the penetrating point of the optical axis through the mirror inclined 45° in reflex position. Another feature of the invention is that in the optical axis of the camera lens, the mirror which is foldable into an effective position and an image field lens are so arranged in tandem-fashion that the lens can serve as taking lens and view finder lens. For this purpose the mirror is disposed within a cage rotatable about the optical axis. The mirror is thereby rotatable about the optical axis of the camera by being guided by its cage, whereby selectively one or the other film is exposed when the associated focal plane shutter runs off, and is also movable about its rotation axis and therefore folded out of its operative position after an exposure. On the dulled surface of the image field lens will then appear the finder image formed by the taking lens, and in connection with an optical reversal system and a parallax-free finder it will be possible to view a laterally uninverted image on a preferred scale of 1:1.

In further accordance with the invention the two focal plane shutters and the film transport are wound by a single gearing, and in connection with the cage holding the mirror means are provided which release the focal plane shutter for the film to be exposed while locking the shutter for the other film. This control permits selective release of the films by a single member and prevents wrong releases. The cage of the mirror is further equipped with other means which in connection with the movement of the mirror cause release of the diaphragm of lenses which include a preselecting diaphragm. This release is positively effected independently of which one of the two films is selectively exposed.

The invention provides therefore a two-film camera in which by the employment of a focal plane shutter for each film an extensive range of shutter times up to the shortest time interval of 1/1000 second is obtained. It is further possible within the scope of the invention to use for each shutter or film a separate device for regulating the exposure time or to couple these devices. The arrangement of the two films and focal plane shutters in vertical direction of movement relative to the optical axis in connection with the provision of a swivable mirror in a cage rotatable about the optical axis affords the advantage that the firmly mounted or preferably exchangeable taking lens may serve also as finder lens, and by the same rotatable cage selective control of the functions for release of the shutter, lens diaphragm and the setting of shutter and film transport by a common gearing are positively effected. This arrangement permits also a compact structure, and both films and focal plane shutters as well as the taking lens, which is relatively large due to the diaphragm preselecting appliance, may be accommodated in a handy casing of attractive shape, which when held at eye level lies smoothly between the balls of the user's thumbs. The operating elements provided on the camera are of simple construction and so arranged thereon that the camera need not be taken down after viewing the finder image between exposures, since all manipulations may be performed while the camera is at eye level.

The invention is illustrated by way of example in the accompanying drawings, wherein parts performing the same functions in both film outfits have the same reference numeral with the mark (') added to indicate the second film. Details not absolutely required for understanding the invention are not shown.

In the drawings,

FIGURE 1 is a sectional plan view of the camera;

FIG. 2, a sectional top view of a part of the camera;

Figure 1:
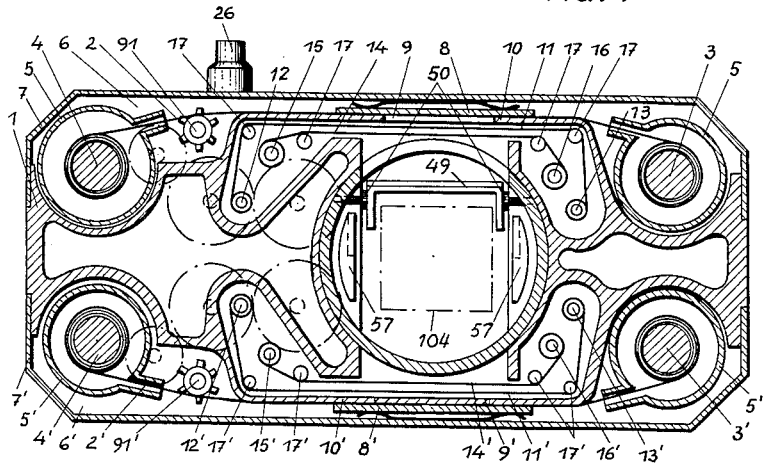
Figure 2:
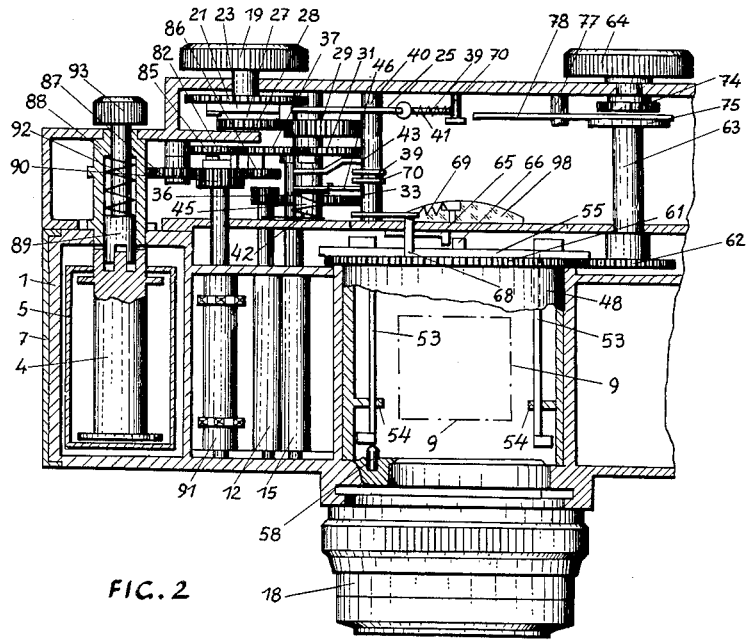

Referring to the drawings, the camera body 1 is equipped for receiving two films 2, 2' with their spools and film holders. For the upper film 2 an unwinding spool 3 and a take-up spool 4 with holders 5 are provided and for the lower film 2', an unwinding spool 3' and take-up spool 4' with holders 5'. Each film with its spools and holders or magazines is separately kept in a light-tight compartment 6, 6' which can be closed and opened by means of a detachable or hinged cover 7, 7'. Owing to this arrangement, the films 2, 2' can be used also without their holders 5, 5'. Elastically disposed pressure plates 8, 8' press the two films 2, 2' within range of the gates 9, 9' against the stage or support 10, 10' below which focal plane shutters are arranged comprising first curtains 11, 11' with the rolls 12, 12' and 13, 13' and second curtains 14, 14' with their rolls 15, 15' and 16, 16'. For guiding both pairs of curtains serve slide rolls 17, 17', and both pairs of curtains possess cutouts for slit formation, the first curtain 11, 11' clearing the gate 9, 9' for exposure and the second curtain 14, 14' closing it again, and the movement of the two curtains is effected by spring tension by way of the curtain rolls 13, 13' and 16, 16'. The drawings show that all film spools and magazines for the two films as well as all curtain rolls and slide rolls of the two focal plane shutters are parallel to the optical axis of the taking lens 18 so that the two films and focal plane shutters extend transversely thereto.

Figure 5:
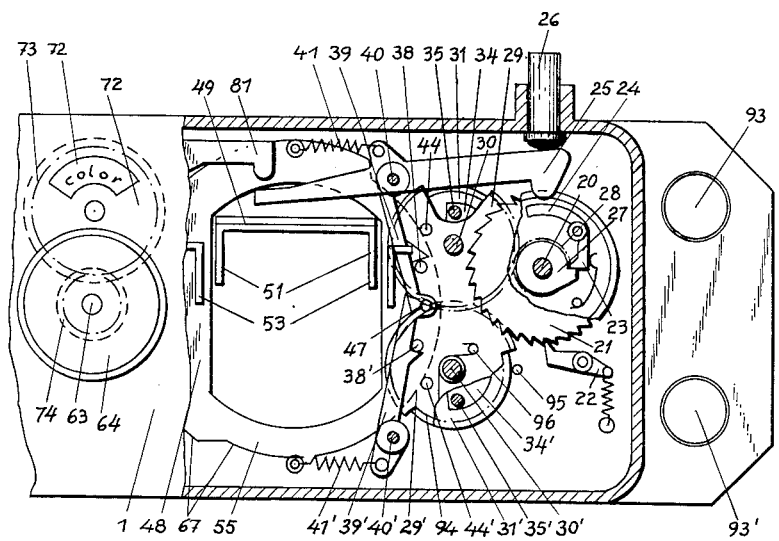
Figure 6:
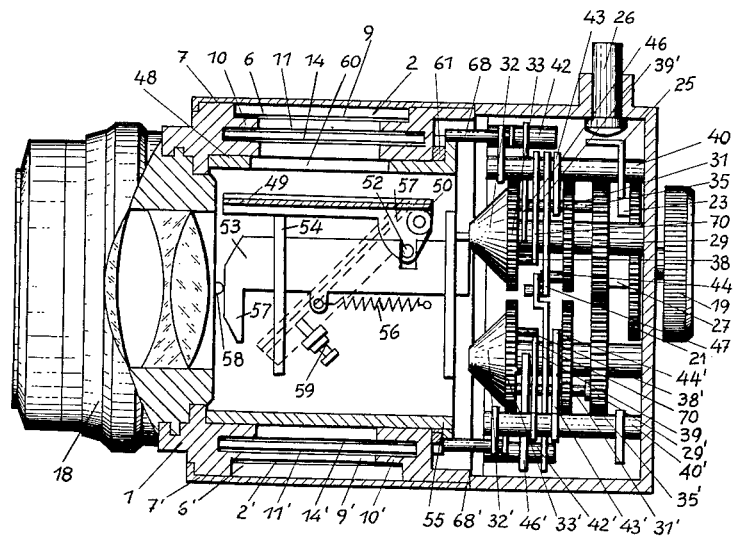
FIGS. 6 and 7 are sectional side views of details of the driving gear and the reflex arrangement in two different operating positions, FIG. 6 showing exposure of the upper film and FIG. 7, exposure of the lower one.
Figure 7:
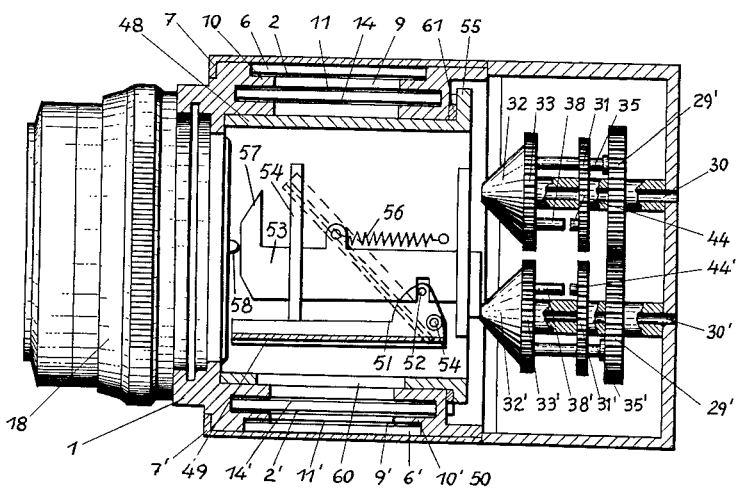

Running and winding of the two focal plane shutters in connection with the film-feed are caused by a common driving gear, winding being effected by a single knob 19, with which, as shown in FIGS. 5 and 6, by a shaft 20 a ratchet wheel 21 is firmly connected which cooperates with a pawl 22 secured to the camera casing so that the winding knob 19 can be turned only in one direction. To the ratchet wheel 21 a spring-actuated feed pawl 23 is movably attached whose additional arm 24, after the shutter and film transport have been set by a full rotation of the knob 19, is within range of a lever 25 which is actuated by a releasing knob 26. The pawl 23 cooperates with a driver 27 firmly connected with the gear wheel 28, and driver 27 and gear 28 are secured on the shaft 20 of the winding knob 19. By means of the gear wheel 28 a gear 29 is driven which is in mesh with the gear wheel 29'.

The upper focal plane shutter is wound by the gear 29 and the lower focal plane shutter by gear 29'. The gear 29 is rotatably mounted on the fixed shaft 30 which carries also a gear 31 and a gear 33 provided with a cam 32, the gears 31 and 33 being rotatably mounted side by side on shaft 30. These two gears have a segmental recess 34 through which a pin 35 passes which is secured to the gear wheel 29. The gear 33 is in engagement with a pinion 36 fastened to the elongated shaft of the curtain roll 12, and the gear 31 is in engagement with a pinion 37 secured to the elongated shaft of the curtain roll 15. To the gear 33 a locking pin 38 is secured which cooperates with a check lever 39 which is rotatably mounted on shaft 40 and firmly connected with the releasing lever 25 by a bushing. A hooked-in spring 41 moves the releasing lever 25 with its check lever 39 into locking position, whereby motion of the two curtains 11, 14 is prevented. The first curtain 11 is set free by the releasing lever 25, 39. The second curtain 14 is locked and released by a locking lever 43 movable about a pin 42 and cooperating with a locking pin 44 secured to the gear 31, a spring 45 moving lever 43 into locking position. By a bearing bush the locking lever 43 is firmly connected with a lever 46. During the run of the first curtain 11 the locking pin 38 secured to the gear 33 lifts the lever 46, and the locking lever 43 firmly connected thereto releases the gear 31 and thereby the second curtain 14.

As shown in FIGS. 3 to 7, the driving gear for the second focal plane shutter is arranged in an analogous manner. It is locked and released by the lever 39' which abuts with its end against a pin 47 secured to lever 39, whereby during the releasing movement of the lever 39 the lever 39' is also moved out of locking position. If this happened, however, both focal plane shutters would jointly run off while, owing to selective exposure, only the focal plane shutter associated with the film to be exposed should be actuated. This is positively attained according to the invention by the reflex arrangement in the following manner.

Between the two films 2, 2' and their two focal plane shutters a cage 48 is rotatably disposed in the camera body 1, the center of said cage lying in the optical axis of the taking lens 18. The cage 48 is hollow, and in its interior a reflex mirror 49 is movably positioned about a bearing 50. On both sides of the mirror-holder flaps 51 are provided to which pins 52 are secured which are engaged by corresponding slots of slide rails 53 guided in the cage 48 by correspondingly formed bearings 54. The slide rails 53 pass through the front side 55 provided on the rear of the cage 48 and formed as collar and, due to the action of a spring 56, lie against the cam 32 of the shutter gear 33, as shown in FIG. 6. On the front side the slide rails 53 possess camlike stops 57 against which bears the releasing pin 58 for the diaphragm of the taking lens 18. When the shutter runs off, the rails 53, by the action of spring 56, slide off from the cam 32 of the run-out shutter gear and thereby move the mirror 49 into reflex position which is limited by an adjusting screw 59. In this position the upper film 2 is exposed, as FIG. 6 indicates. For this purpose the cage 48 possesses on the reflex side a recess 60 corresponding in size at least to that of the gate 9. In this position the opposite gate 9' is simultaneously closed by the peripheral surface of the cage 48. On the rear portion 55 of the cage 48 a toothed rim 61 is in mesh with a gear 62 which is firmly connected by a shaft 63 with a grooved rotatable knob 64, by which the cage 48 with its mirror 49 can be so adjusted that either the upper film 2 or the lower film 2' is exposed. These positions are limited by two stops 65, 65' which are hit by a pin 66 of the cage 48. The front side or member 55 of the cage 48 is formed on its peripheral surface as cam 67 on which by means of a pin 68 slides a locking lever 70 actuated by the spring 69 and movably disposed about the pin 40. On the cam 67 slides likewise by means of a pin 68', a locking lever 70' controlled by the spring 69' and movable about the pin 40'. The locking lever 70 cooperates also with the locking pin 38 of the shutter gear 33, and the locking lever 70' cooperates also with the locking pin 38' of the shutter gear 33' in such manner that at adjustment of the cage 48 and its mirror 49 to the upper film 2 the upper focal plane shutter is released and the lower one locked, and when exposure is set for the lower film, the lower focal plane shutter is released and the upper one locked. For visualizing the respective adjustment serves a marking disc 71 which is visible through a window 72 of the camera body 1 and by a gear 73 in engagement with a gear 74 firmly connected with the shaft 63 of the rotatable knob 64, as shown in FIG. 5.

To the shaft 63 of the knob 64 a control disc 75 is secured having a recess 76 into which, by the action of a spring 79, a lever 78 movable about a pin 77 and being of the two-armed type drops with its nose 80. In this position as shown the mirror-cage 48 is arrested by means of the gear 62 and is placed thereby in effective exposure position and also the lever 25 is released by the arm 81 of the lever 78. During the shifting operation the lever 78 is moved out of the recess 76, whereby the lever 25 is prevented from carrying out its releasing movement. This arrangement helps to permit release of the camera only if the cage 48 is in one or the other effective exposure position.

Figure 3:
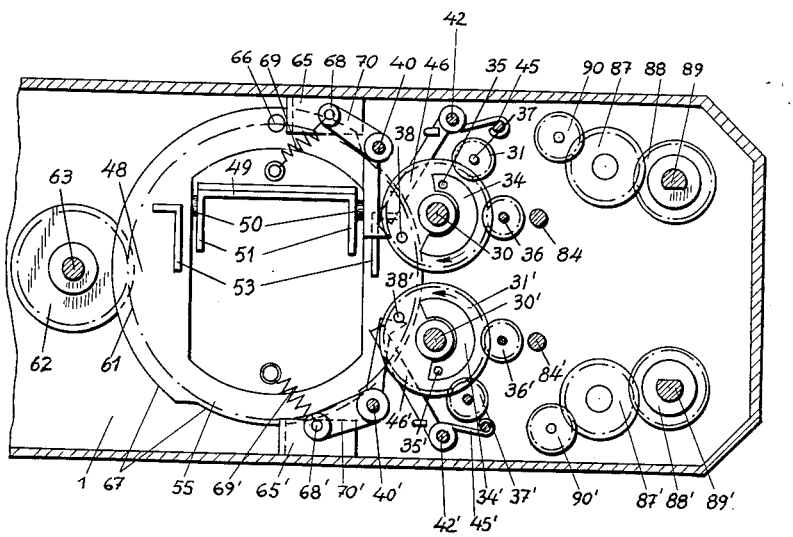
FIGS. 3 to 5 show, seen from the rear, details of the control mechanism and of the driving gear for the two focal plane shutters.
Figure 4:
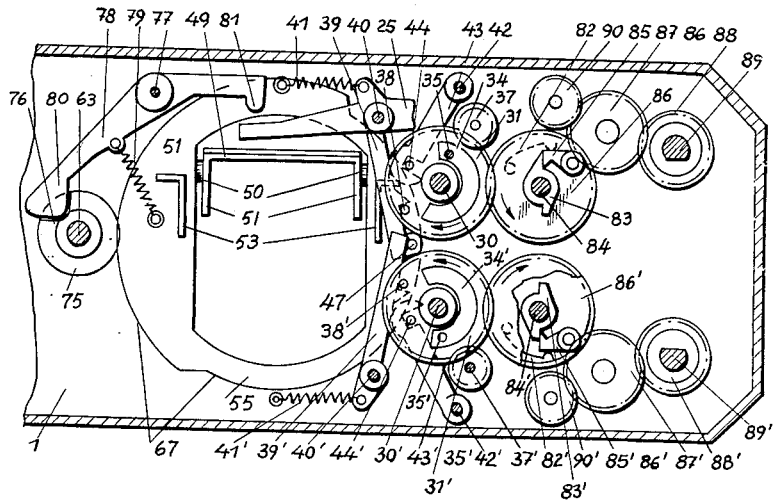

The film transport is coupled with the two shutter gears 31, 31'. With the shutter gear 31, as shown in Figs. 3 and 4, a gear wheel 82 is in engagement to which a coupling 83 having two teeth is secured. The gear 82 and the coupling 83 are rotatably mounted on the shaft 84. With the coupling 83 cooperates a driving gear 86 provided with a pawl 85, which by way of an intermediate gear 87 drives a sleeve 88 in mesh therewith and by means of the film key 89 secured to the gear 87, and by means of a gear 90 drives a film feeding sprocket 91. The film key 89 is coupled with the film spool 4 by a spring 92 and can be uncoupled after displacement by a knob 93, whereupon the film spool 4 with the cassette 5 be exchanged. The driving mechanism described for the film transport becomes effective only at winding of the shutter when pawl 85 is coupled with 83 and thereby the gearing 86 to 90 is driven. When the shutter runs off the coupling 83 turns in opopsite direction and acts as freewheeling unit so that during this movement the driving gear for the film transport and film spool stands still.

The return of the winding gears 27, 28, 29, 29' and therewith the run of the two focal plane shutters are limited by a recess 94 provided on the edge of the gear 29' and striking at the end of the run against the pin 95. For the return of the winding gear a restoring spring 96 is additionally provided and hooked to the gear 29' and to the casing. The pressure exerted by this restoring spring is also relieved during the run of the shutter.

The mode of operation of the camera is as follows:

Assumed that the winding of the two focal plane shutters and of the film transports is completed and that the camera is adjusted for exposure of the upper film 2, and the driving gear and the various parts occupy the position shown in FIGS. 1 to 6.

At release of the camera the lever 25 is moved downwardly by the knob 26, whereby the pawl 23, 24 is released by the driver 27 and the locking pin 38 secured to the shutter gear 33 released by the locking lever 39 secured to the lever 25, so that the first curtain 11 can run off by means of the driving gears 33, 36, 11, 12. At the beginning of this movement the slide rail 53, due to the spring 56, follows the cam 32 secured to the shutter gear 33 and thereby by means of the control pin 58 causes the release of the lens diaphragm as preselected. At the same time the mirror 49 is hereby moved into its reflex position which is limited by the adjustable stop 59. In this position of the mirror indicated by broken lines in Fig. 6 the rays coming from the taking lens 18 are deflected to the upper film 2. During the farther course of the shutter the pin 38 on the shutter gear 33 lifts the lever 46, and the locking lever 43 connected therewith releases the locking pin 44 of shutter 31 so that owing to spring action the second curtain 14 can run off by means of its driving gear 31, 37, 15, 16. During the adjustment for exposure of the upper film 2 the gate of the lower film 2' is covered by the peripheral surface of the cage 48 while the locking lever 70' prevents running of the shutter gear 33' and thus running of the lower focal plane shutter or of the two curtains 11', 14'.

Adjustment for exposure of the lower film 2' is made by turning the knob 64 to turn the cage 48 180° by means of the gear 62 and toothed rim 61 so that now the upper film 2 is covered and the lower film 2' released for exposure. Simultaneously with this adjustment the lever 70' is moved out of locking position by the cam 67 and lever 70 moved into locking position. Movement of the upper focal plane shutter or curtains 11, 14 is now locked and that of the lower focal plane shutter 11', 14' released. With this adjustment the slide rail 53 bears against the cam 32' of the shutter gear 33', and at the run of the lower shutter occurs the movement of the mirror and release of the lens diaphragm. This adjusting position shows FIG. 7 in which the reflex position of the mirror 49 is indicated by broken lines.

At the run of the upper shutter the gear 31 takes along the gear wheel 82 with the coupling 83, and at the run of the lower shutter the gear 31' drives the gear wheel 82' with the coupling 83', and the couplings 83, 83' act as free-wheel units. When the focal plane shutters are being wound by means of their common gearing 21 to 37, 37' and knob 19, the couplings 83, 83', hit with their tooth the pawl 85, 85' and thereby drive the driving gears 86, 86' with their other driving gears for the film transport and the film spools 78 to 92, 78' to 92', the winding movement of both driving mechanisms being limited by the locking lever 39, 39'.

As previously described, the run of the second curtain is released during the run of the first curtain 11, 11' by the shutter wheel 33 by means of the pin 38 and the lever 46, 43, whereby a moving slit exposure is obtained. Regulation of the different exposure times can be effected by adjustable retarding devices which are associated with the shutter gear 31 of the second curtain. It is possible to provide a common retarding device for both shutters or a separate device for each shutter, so that another exposure time may be set for each shutter without any rearrangement. Or the arrangement may be such that the preformation of slits and the setting of different exposure times are exclusively regulated by the assignment of retarding devices. In this case both curtains will run off simultaneously, and the means for releasing the second by the first curtain can be dispensed with.

After its release the mirror 49 is moved into the reflex position and during winding of the shutter is returned to an inoperative position. This mode of operation permits the arrangement of a ground-glass plate or image field lens 98 in the direction of the optical axis of the taking lens 18 which thus serves also as finder lens. The advantage gained thereby is that without an additional finder lens a parallax-free finder is provided for viewing the finder image on a 1:1 scale.

Figure 8:
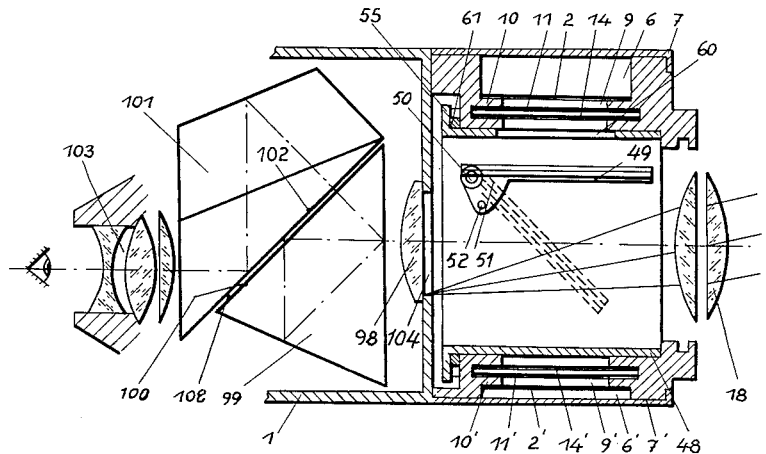
FIGS. 8 and 9 are diagrammatic views of two different examples of an arrangement of the optical taking and view finder appliance.
Figure 9:
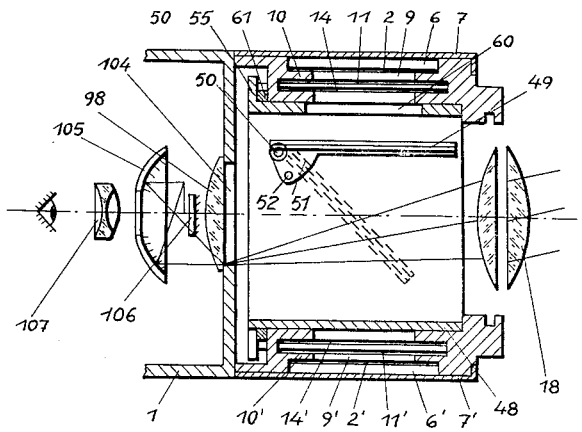

For reversing the finder image formed on the groundglass plate or image field lens 98 by the taking lens 18 two different optical systems are diagrammatically shown in Figs. 8 and 9.

According to FIG. 8, the optical reversal system comprises a combination of a Porro prism 99 and a roof-prism 101 with an air gap 108 between them so that their two surfaces 100, 102 are reflecting, and also a viewing or magnifying system 103 having several lenses. The image formed on the image field lens 98 by the taking lens 18 and surrounded by a gate 104 is first deflected by the Porro prism 99, 100 and then placed side-uninverted by the roof-prism 101, 102 so that at corresponding enlargement a side-uninverted finder image can be viewed through lens system or eyepiece 103 on a 1:1 scale.

FIG. 9 shows another arrangement for complete reversal of the image at short distance. According to this optical system, an image field lens 98 is placed in the path of rays of the taking lens 18 which forms thereon a height- and side-inverted image. Behind the image field lens 98 a concave mirror 105 is provided and between them a plane mirror 106, and the laterally- and height-inverted image formed by the image field lens 98 is thrown by the concave mirror on the plane mirror 106 which by reversal of direction renders the real and reduced image visible and enlarged when viewed through an eyepiece or magnifying lens 107.

The arrangement of all elements of the optical system, as taking lens 18, image field lens 98, concave mirror 105, plane mirror 106 and viewing eyepiece or magnifier 107, in tandem-fashion on a common optical axis which is not bent is an essential feature of the invention, since it affords the advantage of a space- and weight-saving compact structure.

We claim:

1. A two-film camera, comprising in combination, a casing, lens means supported by said casing, light impervious wall means arranged in said casing dividing said casing into a plurality of compartments, two pairs of film feed spools being mounted in two separate compartments of said casing parallel to the optical axis of said lens means and adapted to guide two films in parallel relationship to the optical axis of said lens means through said camera, a cylindrical cage having opaque cylindrical walls rotatably supported by said wall means in said camera, said walls defining an opening, said cylindrical cage being coaxial with said lens means, an annular gear secured to said cage, a shaft rotatably supported by the casing of said camera and projecting therethrough, a knob secured to the projecting portion of said shaft, a gear secured to said shaft, intermediate gear means rotatably mounted in said casing, said intermediate gear means meshingly engaging said gear secured to said shaft and said annular gear secured to said cage, control gear means rotatably supported by said casing and in meshed engagement with said annular gear secured to said cage, said control gears defining a recess, a two-armed lever pivotally supported by said casing, one of said two arms having a projection adapted to matingly engage said recess, two shutter means operatively connected to said film feed spools, said intermediate gear means and said lens means, a mirror pivotally supported in said cage, slidable means intermittently connecting said mirror and said intermediate gear means, said mirror being adapted to be swung about its pivot support by means of said slidable connecting means when said intermediate gear means are released, the other arm of said two-armed lever locking said intermediate gear means when said arm having a projection does not matingly engage said recess.

2. A two-film camera according to claim 1, including stop means mounted on the casing of said camera adjacent said rotatable cage for limiting the rotating movement of said cage and said annular gear secured thereto and said control gear meshed with said annular gear, said stop means stopping the rotary movement of said cage when said projection of one of said two arms matingly engages said recess.

3. A two-film camera according to claim 2, wherein a releasing knob is mounted on said casing, said knob being operatively connected to said intermediate gears for selectively locking or releasing the same, and means connecting said knob to said other arm of said two-armed lever so that said arm locks said releasing knob when said projection does not matingly engage said recess.

4. A two-film camera according to claim 3, wherein said two shutter means comprise two pairs of movable curtains, each pair being mounted on two pairs of spools rotatably supported by said casing parallel to the optical axis of said lens means and adapted to move across said opening of said rotatable cage when said projection matingly engages said recess.

5. A two-film camera according to claim 4, wherein each of said pairs of spools have geared annular portions, said geared annular portions being in meshed engagement with said intermediate gear means, said releasing knob thereby selectively releasing or locking said movable curtains.

6. A two-film camera, according to claim 5, wherein said intermediate gear means are operatively connected to unidirectional actuating means, said actuating means being operatively connected to said geared annular portions of said film spools so that when said winding means rewind said shutter means, said film spools are actuated by said intermediate gear means.

7. A two-film camera according to claim 3, wherein said connecting means include a spring-actuated lever pivotally supported in said casing, said spring-actuated lever being operatively connected to a pair of pivotally supported members, said pair of members being operatively connected to said intermediate gear means and selectively locking and releasing said two shutter means.

8. A two-film camera, according to claim 7, wherein said spring-actuated lever is intermittently abutting against releasable locking means, said releasable locking means being operatively connected to said intermediate gear means, said spring-actuated lever when actuated by said releasing knob abuttingly releases said intermediate gear means through said releasable locking means for rewinding the released shutter means.

9. A two-film camera according to claim 1, including winding means rotatably supported by said casing and operatively connected to said intermediate gear means for manually rewinding said two shutter means, further including a releasing knob mounted on said casing, said knob being operatively connected to said intermediate gears for selectively locking or releasing the same, and including spring-actuating means operatively connected to said intermediate gear means for rotating said intermediate gear means upon release by said releasing knob.

10. A two-film camera according to claim 1, including indicating means mounted on the casing of said camera and operatively connected to said control gear means for indicating the position of said rotatable cage with respect to said two pairs of film feed spools.

11. A two-film camera, according to claim 1, wherein said lens means include a spring-actuated adjustable diaphragm, releasing means operatively connected to said diaphragm, said pivotally supported mirror adapted to abut against said releasing means and actuate the same when said mirror is swung about its pivot by said released intermediate gear means.

12. A two-film camera, according to claim 11, wherein said lens means include control means operatively connected to spring-actuated adjustable diaphragm for adjusting the opening of said diaphragm.

13. A two-film camera, according to claim 11, wherein said releasing means comprise two plates slidably guided in said cage, one end of each of said plates abutting against said intermediate gear means and being slidably pushed forward when said intermediate gear means are released, the other end of each plate triggering thereby said spring-actuating diaphragm.

14. A two-film camera comprising, a housing, a single objective lens in said housing, a plurality of film spools mounted in said housing parallel to the optical axis of said objective lens and capable of supporting a pair of films on opposite sides of the optical axis in parallel planes equidistant from the optical axis of said lens, reflex means movably mounted in said camera along the optical axis of said lens between the positions of the films for selectively conducting light from the lens to either of the films, a focal plane shutter for each of the films, each of said shutters having a pair of curtains adjacent one of the films and being parallel to the optical axis of said lens and each being positioned in said housing along individual paths of light from the reflex means to the films for individually covering and exposing one of the films independently of the other of the films, said reflex means including a cage rotatably mounted along the optical axis of said lens and a pivotally mounted reflex mirror in said case movable into an effective position along the optical axis of said lens so as to reflect light from said lens along a line perpendicular to the axis of said lens; said cage being rotatable between a first position wherein light is reflected by said mirror, when said mirror is in its effective position, toward one of the films, and a second position wherein light is reflected by the mirror toward the other film; said cage having an opening to allow passage of light to one of the films, means for operating said focal plane shutters, and cam means connected to the means for operating said focal plane shutters and in contact with said mirror so as to control movement of said mirror into the effective position when said focal plane shutters are run off.

15. A two-film camera as in claim 14 further comprising an image field lens supported on the side of the housing opposite the side supporting said objective lens and located along the optical axis of said objective lens, said image field lens indicating the image field to an observer when the mirror is in operative position, and optical reversal means connected to said image field lens.

16. A camera as in claim 14, wherein a cam plate is mounted coaxially upon said cage for rotary movement therewith, wherein a pair of locking levers are connected to said cam means and responsive thereto, wherein said focal plane shutters each include a driving mechanism engageable with said locking levers so as to be blocked by said locking levers in response to the position of said cage, whereby when said cage is adjusted to reflect light upon one film, the driving mechanism corresponding to that film is released, and the other driving mechanism is blocked.

17. A camera as set forth in claim 16, further comprising a spur gear coaxially secured to said cage on the outer periphery thereof for rotation of said cage, a winding knob meshingly engaged with said spur gear for operation thereof, a control disc keyed for rotation with said winding knob and having a recess at its edge, a lever member biased into abutting engagement with said control disc at its recess so as to index the position of said cage when said cage is properly rotated for reflecting light to one of the films, whereby error in the setting of the cage is avoided.

18. A two-film camera as set forth in claim 17, further comprising indicating means mounted on the housing of said camera and operatively connected to said knob for indicating the position of the rotatable cage with respect to the films.

19. A two-film camera as set forth in claim 18, further comprising a release plunger projecting into said housing, a spring actuated lever pivotally supported in said housing and in engagement with said plunger, a pair of pivotally supported members connected to said lever, said pair of members each being operatively connected to one of said driving mechanism for selectively locking and releasing said driving mechanism, releasable shutter retaining means in said driving mechanism operatively connected to said spring actuated lever and responsive thereto and capable of restraining operation of said driving mechanism, said spring actuated lever when actuated by said release plunger being effective to release said driving mechanism whereby the mechanism may be rewound.

20. A two-film camera as set forth in claim 19, further comprising winding means rotatably supported in said casing and a gear train included in said driving mechanism, said winding means being connected to said gear train for manually rewinding said focal plane shutters.

21. A two-film camera as set forth in claim 20, wherein said gear train is operatively connected to said winding means so that when said winding means rewind said shutter means said film spools are actuated by said gear train.

22. A two-film camera as set forth in claim 21, further comprising actuating means operatively connected to said gear train for rotating said gear train upon release of said releasing plunger.

23. A two-film camera as set forth in claim 22, further comprising a lens mount for said objective lens including a spring actuated diaphragm, releasing means operatively connected to said diaphragm, said reflex means being adapted to abut against said releasing means and actuate the same when said cage is swung about its pivot by said released gear train, said lens mount including control means operatively connected to said spring actuated diaphragm for adjusting the opening of said diaphragm.

24. A two-film camera as set forth in claim 23, wherein said releasing means comprise a pair of plates slidably guided in said cage, one end of each of said plates abutting against said gear train and being slidably pushed forward when said gear train is released, the other end of each plate triggering thereby said spring actuated diaphragm.

25. A two-film camera as set forth in claim 24, further comprising an image field lens, supported on the side of said housing opposite the side supporting said lens mount and being located along the optical axis of said objective lens, said image field lens indicating the image field to an observer when said mirror is in the ineffective position.

26. A two-film camera as set forth in claim 25, further comprising optical reversal means connected to said image field lens.

27. A two-film camera as set forth in claim 26, further comprising optical enlarging means connected to said image field lens, and wherein said optical reversal means include porro-prism means and roof-prism means operatively connected to each other.

28. A two-film camera as set forth in claim 27, wherein said optical reversal means include a concave mirror supported by said housing along the optical axis of said lens, a flat mirror supported by said housing between said image field lens and said concave mirror along the optical axis, and a magnifying lens supported by said housing along said optical axis, said magnifying lens being spaced from said concave mirror.

29. A two-film camera, according to claim 15, including optical enlarging means connected to said image field lens.

30. A two-film camera, according to claim 15, wherein said optical reversal means include porro-prism means and roof-prism means operatively connected to each other.

31. A two-film camera, according to claim 15, wherein said optical reversal means include a concave mirror supported by said casing along the optical axis of said lens means, a flat mirror supported by said casing between said image field lens and said concave mirror along said optical axis and a magnifying lens supported by said casing along said optical axis, said magnifying lens being spaced from said concave mirror.

References Cited in the file of this patent

UNITED STATES PATENTS

| | | |
|---|---|---|
| 2,245,606 | Rauch | June 17, 1941 |
| 2,506,863 | Fassin | May 9, 1950 |
| 2,521,404 | Pentland | Sept. 5, 1950 |
| 2,540,351 | Rundell | Feb. 6, 1951 |

FOREIGN PATENTS

| | | |
|---|---|---|
| 658,467 | Germany | Apr. 8, 1938 |
| 707,146 | Germany | June 14, 1941 |
| 887,005 | Germany | Aug. 20, 1953 |